United States Patent
Aggarwal et al.

(10) Patent No.: US 10,134,113 B1
(45) Date of Patent: Nov. 20, 2018

(54) DIGITAL MEDIA ENVIRONMENT FOR REMOVAL OF INTERFERENCE PATTERNS FROM DIGITAL IMAGES

(71) Applicant: Adobe Systems Incorporated, San Jose, CA (US)

(72) Inventors: Vipul Aggarwal, New Delhi (IN); Sumeet Sahu, New Delhi (IN); Naveen Prakash Goel, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 22 days.

(21) Appl. No.: 15/637,202

(22) Filed: Jun. 29, 2017

(51) Int. Cl.
*G06T 5/00* (2006.01)
*H04N 1/58* (2006.01)
*G06K 9/46* (2006.01)

(52) U.S. Cl.
CPC ............ *G06T 5/001* (2013.01); *G06K 9/4609* (2013.01); *G06T 5/002* (2013.01); *H04N 1/58* (2013.01); *G06T 2207/20024* (2013.01); *G06T 2207/20192* (2013.01)

(58) Field of Classification Search
CPC ............... G06T 5/001; G06T 5/002; G06T 2207/20192; G06T 2207/20024; G06T 7/13; G06T 2207/20182; G06T 2207/20208; H04N 1/58; G06K 9/4609; G06K 9/00503; G06K 9/0051; G06K 9/40; G06K 9/4604
See application file for complete search history.

*Primary Examiner* — Christopher D Wait
(74) *Attorney, Agent, or Firm* — Wolfe-SBMC (57) ABSTRACT

Techniques for removal of interference patterns from digital images are described, in which a spatially-adaptive filter is applied to a pixel based on a context of the pixel. In an example, an edge of an object in a digital image is located in a digital image creation system. Then, context data is generated for a pixel in the digital image. The context data includes a distance from the edge of the object to the pixel. The digital image creation system can also generate color data and luminance data for the pixel, representing a similarity of color and luminance between the pixel and surrounding pixels within the digital image. Then, the digital image creation system constructs a spatially-adaptive filter for the pixel based on the context data for the pixel. The digital image creation system removes an effect of the interference pattern at the pixel in the digital image by applying the spatially-adaptive filter to the pixel.

20 Claims, 8 Drawing Sheets

DIGITAL MEDIA ENVIRONMENT FOR REMOVAL OF INTERFERENCE PATTERNS FROM DIGITAL IMAGES

BACKGROUND

As technology expands, documents are more frequently created, edited, and stored in a digital format rather than in a hard-copy or print format. As a result, hard-copy documents are often scanned or photographed to transform the content of the hard-copy document into a digital image. Conventional systems for transforming a hard-copy document to a digital image, however, are confronted with a variety of challenges that affect an ability to preserve the quality and content of the hard-copy document.

Interference patterns, for instance, often occur when a hard-copy document is scanned or photographed, which have a negative impact on the visual quality of the resultant digital image. One example of an interference pattern is a moiré pattern, which can occur when rows of pixels captured by a scanner or digital camera do not align with printed rows of the hard-copy document. Interference patterns have a negative impact on subsequent operations performed on the digital image created from the hard-copy document, reducing accuracy of image-based search, object segmentation, and "big data" analysis.

SUMMARY

Techniques are described for removal of interference patterns from digital images in a digital media environment. In one example, a context is established by a computing device for individual pixels in a digital image to generate a spatially-adaptive filter to remove interference patterns for multiple pixels in the digital image. In this way, the spatially-adaptive filter can be used by the computing device to apply corrections for interference patterns while preserving essential details of the content of the digital image.

An edge of an object in a digital image, for instance, may be located by a digital image creation system implemented by one or more computing devices. To distinguish edges of objects in the digital image from artifacts caused by an interference pattern, the digital image creation system may applies an edge detection filter that preserves prominent edges (e.g., edges of objects in the digital image) and discards minor edges (e.g., edges of an interference pattern), such as a lossy filter. The digital image creation system then generates context data for a pixel in the digital image. The context data includes a distance from the edge of the object to the pixel. When multiple edges exist in the digital image, the digital image creation system can select an edge nearest to the pixel to use in generating the context data for the pixel. The distance of the pixel to the nearest edge is used in this example to determine a size of a neighborhood of the pixel, which the digital image creation system then uses to determine parameters of a spatially-adaptive filter for the pixel.

The digital image creation system can also generate color data and luminance data for the pixel. The color data represents a similarity of color between the pixel and surrounding pixels in the neighborhood of the pixel within the digital image. Similarly, the luminance data represents a similarity of luminance between the pixel and surrounding pixels in the neighborhood of the pixel within the digital image.

From this, the digital image creation system constructs a spatially-adaptive filter for the pixel based on the context data for the pixel. The spatially-adaptive filter, for instance, can be constructed by the system to apply an amount of smoothing to the pixel that is directly proportional to the distance of the pixel from the located edge. Additionally, the spatially-adaptive filter can be constructed by the system to apply an amount of smoothing to the pixel that is inversely proportional to a variance in color and/or luminance between the pixel and its surrounding pixels.

The digital image creation system then removes an effect of the interference pattern at the pixel in the digital image by applying the spatially-adaptive filter to the pixel. Using the example of the directly proportional spatially-adaptive filter described above, a filter that applies minimum smoothing can be constructed for a pixel located at or near an edge of an object to preserve the sharpness of the edge. On the other hand, a filter that applies a greater amount of smoothing can be constructed for a pixel in a generally uniform area of the digital image, which may have increased effectiveness at removing interference patterns at the pixel's location. In this way, the digital image creation system may improve accuracy and visual quality of the digital image over conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Hard-copy documents are oftentimes recreated as digital images to increase ease of storage, communication, and interaction with the documents. However, a digital image of a hard-copy document captured using conventional techniques often contains interference patterns that detract from the quality and content of the digital image. One example of an interference pattern is a moiré pattern, which is the result of an opaque, ruled pattern with transparent gaps overlaid on another similar pattern. The two opaque, ruled patterns that cause the moiré pattern are not completely identical, i.e., the patterns are displaced, rotated, have a different but similar pitch, and so forth. Accordingly, moiré patterns can result when lines used to print a hard-copy document do not align with the pixel rows of the digital image of the hard-copy document.

Conventional systems for reducing the appearance of interference patterns have numerous shortcomings. For example, conventional systems may apply a de-screening filter to remove a moiré pattern from a digital image of a hard-copy document. De-screening filters used by conventional systems typically apply global smoothing to the digital image. When a small amount of global smoothing is applied by a de-screening filter, however, the moiré pattern is still often highly visible and causes the resultant digital image to appear degraded and full of noise. In another example, conventional attempts to remove the moiré pattern diminish visibility of content of the digital image. When a large amount of global smoothing is applied by a de-screening filter, for instance, over-smoothing may cause a loss of detail in patterns, edges, color detail, and so forth, which further causes the digital image to appear blurred.

Accordingly, techniques and systems are described in which a digital image creation system is configured to remove interference patterns by applying a spatially-adaptive filter. The spatially-adaptive filter is constructed based on a context of a particular pixel of a digital image. The digital image creation system, for instance, may be configured to support creation and editing of digital images as part of an application of a computing device in a variety of different ways. Examples of which include use as part of an online application (via a subscription-based service system), provide opportunities to purchase a good or service, online storage, or other web service that is accessible via a network. Digital images may include a variety of different content that may be stored digitally or electronically, e.g., movies, books, documents, games, applications, images, audio files, and so on.

To begin, the digital image creation system locates an edge of an object in a digital image. In one example, the digital image is captured of a physical hard-copy document, and contains an interference pattern. The digital image may be obtained in a variety of ways, such as by scanning the hard-copy document, capturing the digital image using a digital camera, and so forth. The interference pattern may result from a variety of different factors, such as misalignment of the hard-copy document. The digital image creation system locates the edge of the object using edge detection techniques that identify points in the digital image where the image brightness sharply changes, e.g., over a threshold amount. To avoid identifying artifacts caused by an interference pattern as an edge of an object, the digital image creation system applies an edge detection filter that preserves prominent edges (e.g., edges of objects in the digital image) and discards minor edges (e.g., edges of an interference pattern), such as a lossy filter. A lossy filter lessens the chances of a false-positive detection of an edge of the interference pattern as an edge of an object in the digital image when compared to more high-powered, precise edge detection techniques.

The digital image creation system generates context data for a pixel in the digital image that is based on a distance from the edge of the object to the pixel. When multiple edges exist in the digital image, the digital image creation system selects an edge nearest to the pixel to use in generating the context data for the pixel. The distance of the pixel to the nearest edge is used to determine a size of a neighborhood of the pixel. The digital image creation system uses the size of the neighborhood in determining parameters of a spatially-adaptive filter for the pixel as further described in the following sections, such as an amount of smoothing to apply to the pixel.

The context data may also include color data and luminance data for the pixel. The color data represents a similarity of color between the pixel and surrounding pixels in the neighborhood of the pixel within the digital image. The luminance data represents a similarity of luminance between the pixel and surrounding pixels in the neighborhood of the pixel within the digital image. The color data and the luminance data provide information defining an amount of variance of color and luminance that exists in the content of the digital image within the neighborhood surrounding the pixel.

Next, the digital image creation system constructs a spatially-adaptive filter for the pixel based on the context data for the pixel, and removes an effect of the interference pattern at the pixel in the digital image by applying the spatially-adaptive filter to the pixel. For example, the spatially-adaptive filter can be constructed to apply an amount of smoothing to the pixel that is directly proportional to the distance of the pixel from the located edge. Additionally, the spatially-adaptive filter can be constructed to apply an amount of smoothing to the pixel that is inversely proportional to a variance in color and/or luminance between the pixel and its surrounding pixels.

In doing so, the digital image creation system applies a small amount of smoothing if the pixel is part of, or near to, the edge of the object in the digital image. While the interference pattern may not be smoothed at a pixel near an edge of an object, the edge of the object remains preserved and sharp. Further, because the image brightness changes sharply at the edges as discussed above, allowing some of the interference pattern to remain at the edge of the object is not noticeable when looking at the digital image.

On the other hand, the digital image creation system can apply a larger amount of smoothing if the pixel is far from the edge of the object in the digital image, for example, in a uniform patch of the digital image. Interference patterns are typically more noticeable in uniform patches of color and luminance than at or near edges of objects. Consequently, application of a significant amount of smoothing to pixels in uniform patches of color and luminance, and that are farther from an edge, effectively removes the interference pattern where it is most noticeable.

The described techniques for removing interference patterns by applying a spatially-adaptive filter constructed based on a context of a particular pixel provide digital images containing fewer remnants of interference patterns while maintaining the overall sharpness and contrast of the digital image. Further, the described techniques preserve the edges of objects in the digital image while filtering out edges created from the interference pattern. Accordingly, digital images may be created that exhibit increased quality (e.g., are visually pleasing) and promote increased accuracy in scenarios such as image-based search, object segmentation, and big data analysis, to name a few examples.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
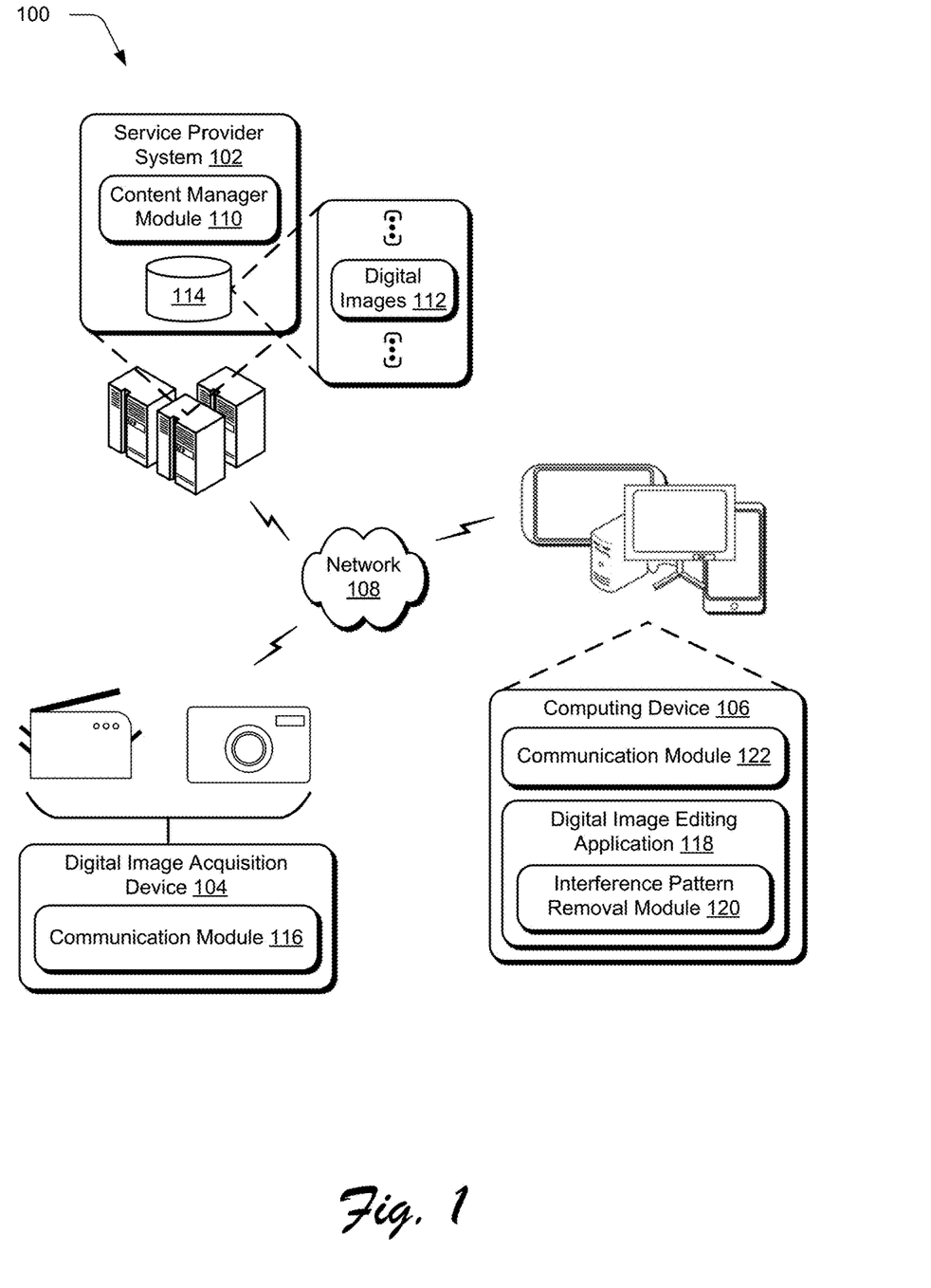
FIG. 1 is an illustration of an environment in an example implementation that is operable to employ techniques for removal of interference patterns from digital images as described herein.

FIG. 1 is an illustration of a digital medium environment 100 in an example implementation that is operable to employ techniques for removal of interference patterns from digital images as described herein. The illustrated environment 100 includes a service provider system 102, a digital image acquisition device 104, and a computing device 106 that are communicatively coupled, one to another, via network 108. Computing devices that implement the service provider system 102, the digital image acquisition device 104, and the computing device 106 may be configured in a variety of ways.

A computing device, for instance, may be configured as a desktop computer, a laptop computer, a mobile device (e.g., assuming a handheld configuration such as a tablet, digital camera, or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 8.

The service provider system 102 is illustrated as including a content manager module 110 that is implemented at least partially in hardware of a computing device. The content manager module 110 is configured to manage online interaction via the network 108 of the digital image acquisition device 104 and the computing device 106 with digital images 112, which are stored in storage 114 of the service provider system 102. As previously described, the digital images 112 may take a variety of forms, such as any content that may be stored digitally or electronically, e.g., movies, books, documents, games, applications, images, audio files, and so on. Thus, interaction with the digital images 112 by the digital image acquisition device 104 and the computing device 106 via the network 108 may also take a variety of forms, such as selection of a menu item, voice command, gesture, selection of a hyperlink, and so forth.

The digital image acquisition device 104 is a computing device configured to acquire digital images using various techniques. As shown, the digital image acquisition device 104 may be a photocopier that may include additional functionality such as a fax machine, a scanner, a computer-network connected printer, and so forth. The digital image acquisition device 104 may also be a digital camera as shown, and as such may be incorporated into additional devices such as mobile phones, tablets, laptop computers, and so on.

Regardless of the form taken by the digital image acquisition device 104, the digital image acquisition device provides functionality to acquire digital images of hard-copy documents and/or physical documents as described herein. For example, the digital image acquisition device 104 may acquire digital images of hard-copy documents by scanning the hard-copy document, taking a photograph of the hard-copy document, receiving a facsimile of the hard-copy document, and so on. The digital image acquisition device 104 includes a communication module 116 that enables the digital image acquisition device to interact with the digital images 112, such as by providing, accessing, and editing the digital images, e.g., as part of a subscription-based service.

The computing device 106 is shown as including a digital image editing application 118 which allows users to interact with digital images, such as by viewing, creating, assembling, editing, compressing, and so forth. Examples of applications that provide functionality which may be included in the digital image editing application 118 include Adobe PDF Library SDK™ (software development kit), Adobe Acrobat™, Adobe Photoshop™, and so on. The computing device 106 is also shown as including an interference pattern removal module 120, which may be included as part of the digital image editing application 118. The interference pattern removal module 120 is configured to remove interference patterns from digital images as discussed above and below. Furthermore, the computing device 106 includes a communication module 122 that enables the computing device to interact with the digital images 112, such as by providing, accessing, and editing the digital images 112, e.g., as part of a subscription-based service.

In implementations, the interference pattern removal module 120 obtains a digital image, such as from the digital image acquisition device 104 via the network 108, or from the digital images 112 located in the storage 114 of the service provider system 102 via the network, to name some examples. The digital image may be captured from a hard-copy document, and may contain an interference pattern such as a moiré pattern. For example, the digital image may be a scanned image of a hard-copy photograph, a photograph of a magazine article captured with a digital camera, a facsimile of a business document, and so forth. The interference pattern may result from a pattern of the lines used to print the hard-copy document not aligning with the pixel rows of the digital image, for instance.

The interference pattern removal module 120 removes the interference pattern in the digital image by applying a spatially-adaptive filter generated for individual pixels of the digital image. Specifically, the interference pattern removal module 120 locates an edge of an object in the digital image, and determines a distance from the located edge to a particular pixel. By using the determined distance between the located edge and the particular pixel, the interference pattern removal module 120 establishes a neighborhood of the particular pixel, and generates context data for the particular pixel regarding the neighborhood surrounding the particular pixel. The context data is used to generate a spatially-adaptive filter for the pixel that can apply a varying amount of smoothing to the particular pixel based on the context data. The spatially-adaptive filter removes and/or reduces the appearance of the interference pattern in the digital image.

The digital image with the interference pattern removed can be output by the communication module 122, such as to the service provider system 102 to be stored in the storage 114. The service provider system 102 can make digital images 112 available to additional devices, for example additional client devices via the network 108, e.g., part of a subscription-based service.

Figure 2:
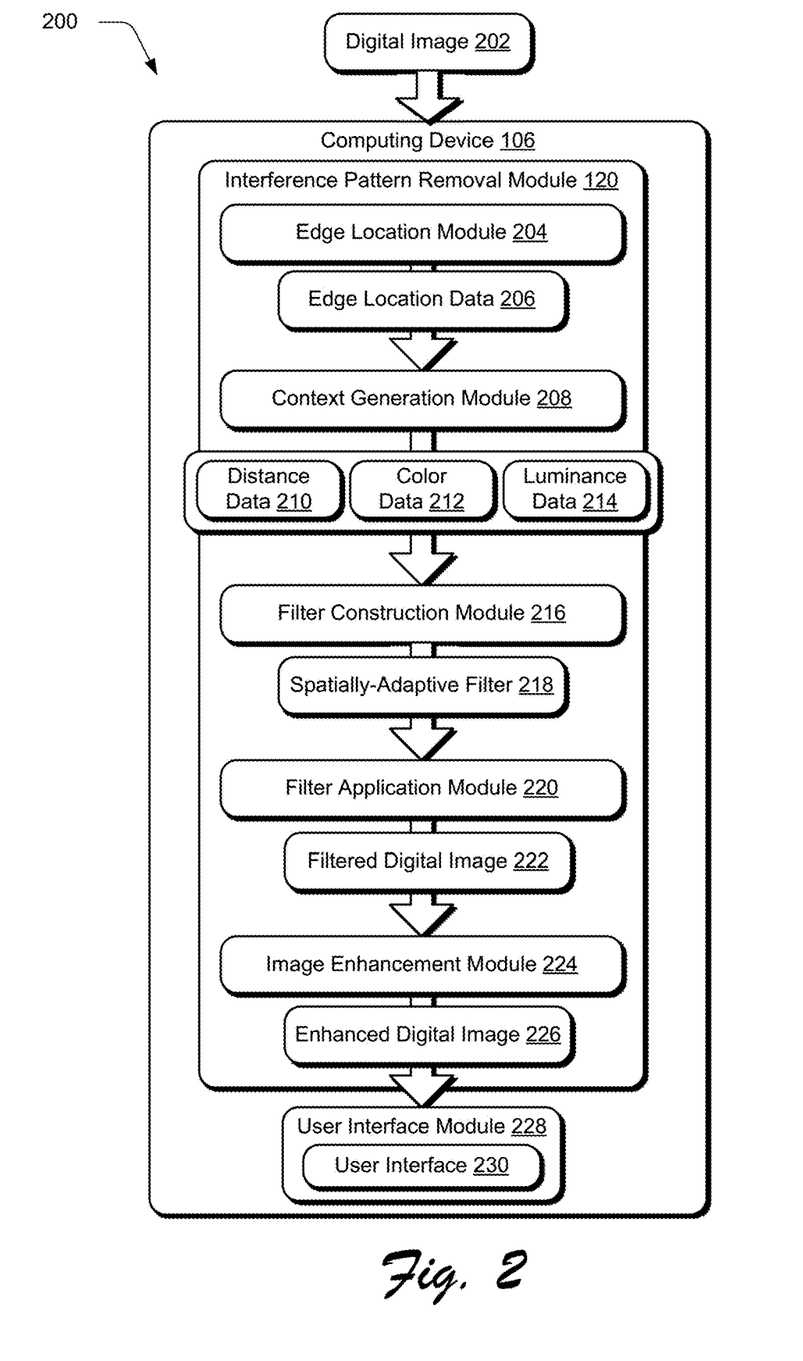
FIG. 2 depicts a system in an example implementation showing operation of an interference pattern removal module of FIG. 1 in greater detail.

FIG. 2 depicts a system 200 in an example implementation showing operation of the interference pattern removal module 120 of FIG. 1 in greater detail. To begin this example, the interference pattern removal module 120 receives a digital image 202, such as from a digital image acquisition device 104 and/or a service provider system 102 as described above. In one example, the digital image 202 may be a digital image of a hard-copy document that includes an interference pattern. As discussed above, the interference pattern may result when lines used to print the hard-copy document do not align with the pixel rows of the digital image, for instance.

An edge location module 204 locates an edge of an object within the digital image 202. The edge location module 204 uses edge detection techniques to locate the edge of the object in the digital image 202, such as by identifying points in the digital image at which the image brightness changes sharply or has discontinuities. The edge location module 204 may employ search-based edge detection, zero-crossing edge detection, or other techniques to locate the edge of the object.

The edge location module 204 may also apply a lossy edge detection filter to the digital image 202 before performing edge detection in order to ensure that lines caused by the interference pattern are not interpreted as edges of the object. The lossy edge detection filter, for example, may preserve prominent edges (e.g., edges of objects in the digital image) and discard minor edges (e.g., edges of an interference pattern). A lossy filter is a form of quantization that compresses a range of values in the frequency domain of the digital image to a single quantum value. A lossy filter thus uses inexact approximations and partial data discarding to represent the content of the digital image. As details are removed from the content of the digital image 202 with the lossy filter, the interference pattern that is made up of perceptible but inconsequential line patterns is also removed, leaving only the prominent edges of objects in the digital image. The inexact approximations made by the lossy filter when detecting edges thus reduces the chances of a false-positive detection of an edge of the pattern as an edge of an object in the digital image when compared to more high-powered, precise edge detection techniques.

Once the edge location module 204 has located the edge of the object in the digital image 202, the edge location module generates edge location data 206 representing the locations of edges in the digital image. While the edge location module 204 may generate a copy of the digital image 202 using the lossy edge detection filter as described above, the copy of the digital image may simply be used to determine locations of the edges of objects as opposed to edges caused by the interference pattern. Consequently, a copy of the digital image used to determine locations of the edges of objects in the digital image 202 may not be included in the edge location data 206.

Next, a context generation module 208 generates context data for a pixel in the digital image 202. The context data includes distance data 210 that represents a distance from the edge of the object to the pixel. The context generation module 208, for instance, uses the distance from the edge of the object to the pixel to determine a size of a neighborhood for the pixel to include in the distance data 210. For example, a size of the neighborhood of the pixel may be proportional to the distance from edge of the object to the pixel. The context generation module 208 also generates color data 212 and luminance data 214 for surrounding pixels within the neighborhood based on the distance data 210. Therefore, an amount of color data 212 and luminance data 214 generated for different pixels may vary based on the distance from the edge of the object to the pixel, as the size of the neighborhood being evaluated changes.

Figure 3:
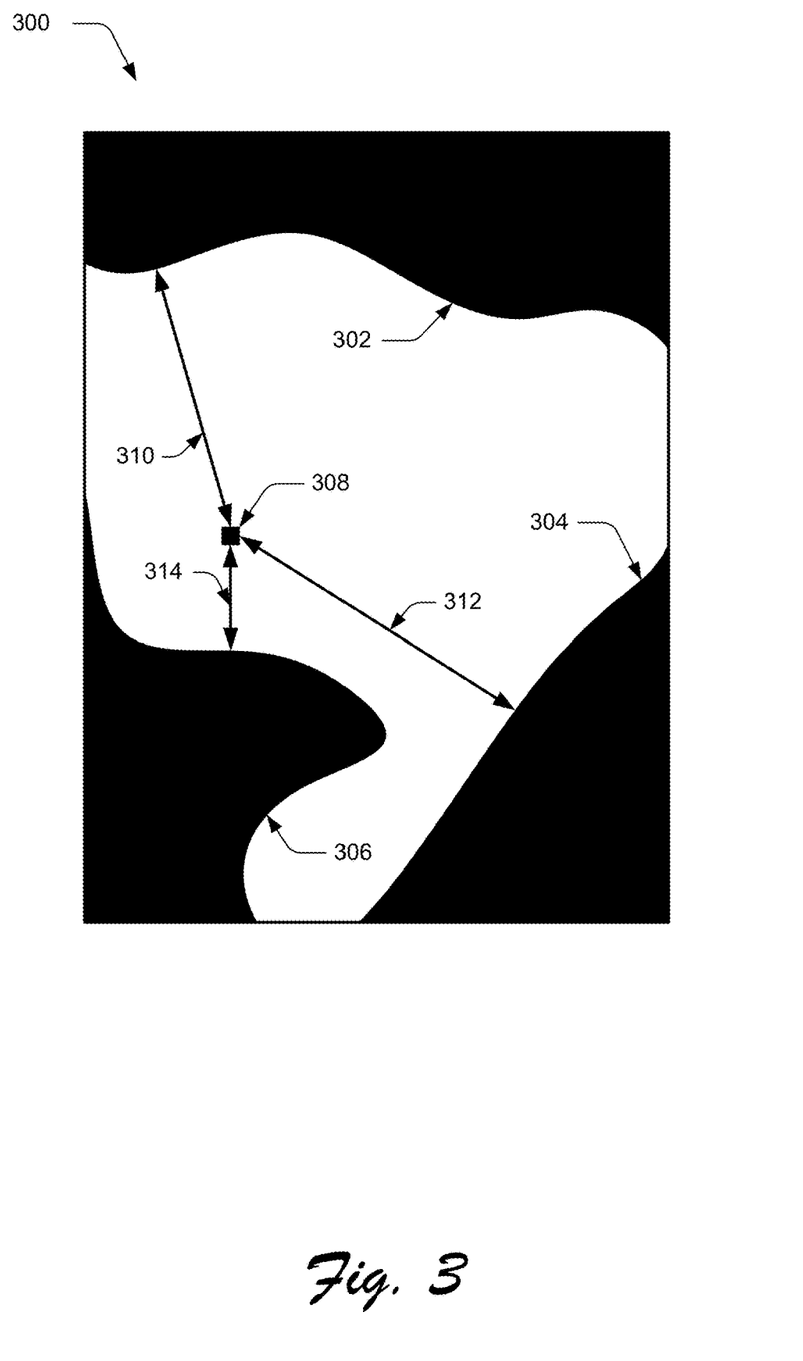
FIG. 3 depicts an example of pixel-to-edge distance determination which may be utilized by the interference pattern removal techniques described herein.

When multiple edges exist in the digital image 202, the context generation module 208 may generate the context data 210 based on a variety of factors, an example of which is an edge of an object that is nearest to the pixel. For example, consider FIG. 3 depicting an example of pixel-to-edge distance determination which may be utilized by the interference pattern removal techniques described herein. FIG. 3 illustrates a digital image generally at 300, including edges 302, 304, 306 of objects and a target pixel 308. The context generation module 208 of FIG. 2, for instance, determines respective distances 310, 312, 314 from the target pixel 308 to each of the edges 302, 304, 306. The distances 310, 312, 314 represent a shortest distance from the target pixel 308 to a location along each of the respective edges 302, 304, 306. From this, the context generation module 208 determines that the distance 314 to the edge 306 is the shortest of the distances 310, 312, and 314. Consequently, the context generation module 208 includes the distance 314 in the distance data 210 for the pixel 308. Further, the context generation module 208 uses the distance 314 to determine a size of a neighborhood for the pixel 308, and includes the size of the neighborhood based on the distance 314 in the distance data 210 for the pixel 308.

Returning to a discussion of FIG. 2, the context generation module 208 also generates color data 212 for the pixel in the digital image 202. The color data 212 represents a similarity of color between the pixel and surrounding pixels in the neighborhood of the pixel within the digital image 202. The color data 212 provides information defining an amount of variance of color that exists in the content of the digital image 202 within the neighborhood surrounding the pixel.

Figure 4:
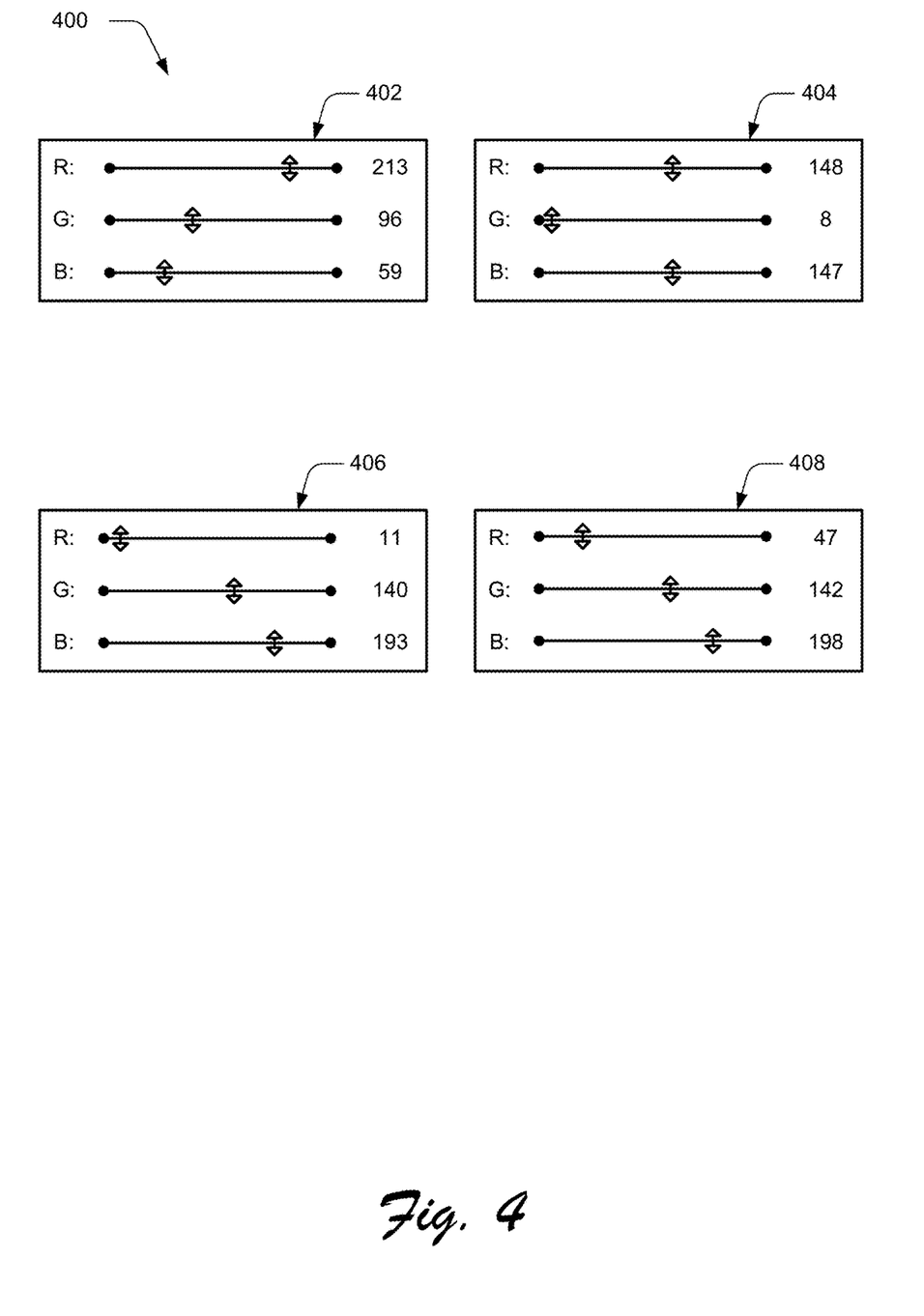
FIG. 4 depicts an example of color comparison between a pixel and surrounding pixels which may be utilized by the interference pattern removal techniques described herein.

In an example, consider FIG. 4, which depicts a color comparison between a pixel and surrounding pixels generally at 400, which may be utilized by the interference pattern removal techniques described herein. Various RGB (red-green-blue) value indicators are shown, which represent amounts of each of the three additive primary colors are used to create a color for one or more pixels. In this example, numeric representations of 0-255 are used for each of the three colors that contribute to the color of one or more pixels, although other metrics are considered including fractions from 0 to 1 (arithmetic notation), percentages, digital 16-bit per channel (e.g., values ranging from 0 to 65,535) and so forth.

The context generation module 210, for example, may generate color data 212 for a target pixel. A first value indicator 402 displays RGB values for the target pixel, in this case 213 for red, 96 for green, and 59 for blue. The values specified in the value indicator 402 for the target pixel can be included in the color data 212 for the target pixel. A second value indicator 404 displays RGB values for the pixels in the neighborhood designated in the distance data 210, in this case 149 for red, 8 for green, and 147 for blue. The values specified in the second value indicator 404 for the pixels in the neighborhood can be included in the color data 212 for the target pixel. The second value indicator 404, for instance, may indicate an average of color values of the pixels in the neighborhood designated in the distance data 210. Alternatively or additionally, RGB color values for multiple pixels in the neighborhood may be included in the color data 212 for the target pixel.

Additionally, the context generation module 210 may include variance data in the color data 212, indicating a variance in RGB values of pixels in the neighborhood surrounding the target pixel. Variance measures how much values in a dataset are likely to differ from the mean of the values. In areas of the digital image with high color variance, the interference pattern is less likely to be noticed by the human eye, and therefore less smoothing is needed in these areas. In areas of the digital image with little color variance, the interference pattern is more likely to be noticed by the human eye, and therefore more smoothing is needed in these areas.

Consider the second value indicator 404 as an average of RGB values of the pixels in the neighborhood surrounding the target pixel. In this example, the RGB values for the target pixel indicated in the first value indicator 402 vary significantly from the average values included in the second value indicator 404. The first value indicator 402 and the second value indicator 404 provide an example of a neighborhood with high variance surrounding the target pixel. Because of the high variance, an interference pattern is not likely to be noticeable in this neighborhood, and then less smoothing is used to remove the interference pattern at the target pixel.

Consider a third value indicator 406, which displays RGB values for a second target pixel including 11 for red, 140 for green, and 193 for blue. A fourth value indicator 408 displays an average of RGB values of pixels in the neighborhood surrounding the second target pixel, including 47 for red, 142 for green, and 198 for blue. The third value indicator 406 and the fourth value indicator 408 provide an example of a neighborhood with little variance surrounding the second target pixel. Because of the little color variance, an interference pattern is likely to be more noticeable in this neighborhood, and increased amounts of smoothing are used to remove the interference pattern at the second target pixel.

Returning to a discussion of FIG. 2, the context generation module 208 may also generate luminance data 214 for the pixel in the digital image 202. The luminance data 214 represents a similarity of luminance between the pixel and surrounding pixels in the neighborhood of the pixel within the digital image 202. The luminance data 214 defines an amount of variance of luminance that exists in the content of the digital image 202 within the neighborhood surrounding the pixel.

Figure 5:
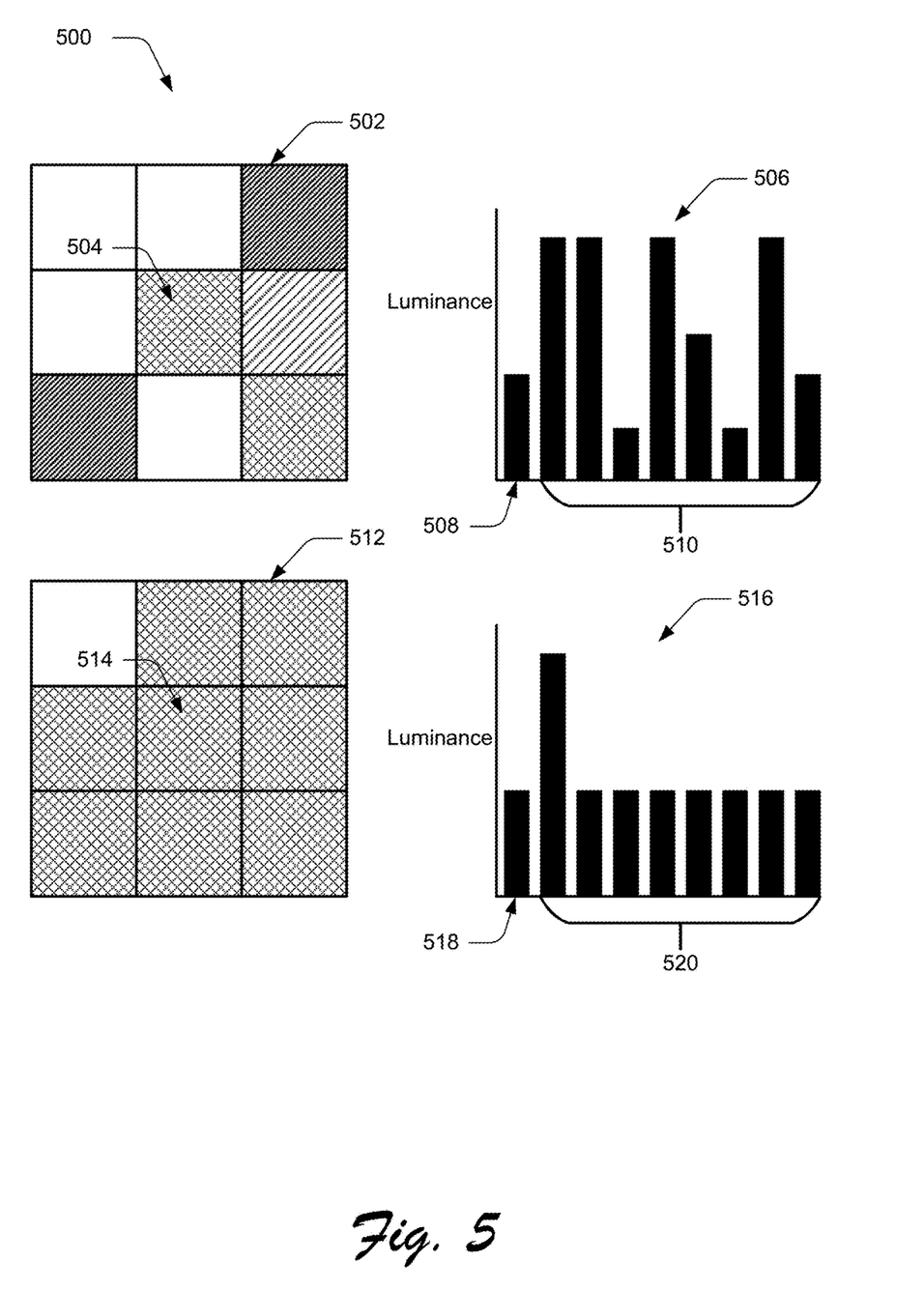
FIG. 5 depicts an example of luminance comparison between a pixel and surrounding pixels which may be utilized by the interference pattern removal techniques described herein.

In an example, consider FIG. 5, depicting an example of luminance comparison between a target pixel and surrounding pixels generally at 500, which may be utilized by the interference pattern removal techniques described herein. A first neighborhood of pixels 502 is shown that surrounds a target pixel 504. In this example, the neighborhood of pixels 502 is three pixels by three pixels in size, although any suitable number of pixels may be included in the neighborhood when performing a luminance comparison. As described above, for instance, the size of the neighborhood of pixels may be determined based on a distance from the target pixel to a nearest edge of an object in the digital image.

The context generation module 210 determines a luminance value for the pixels in the neighborhood 502, including the target pixel 504. For example, the context generation module 210 may determine luminance for pixels in the neighborhood 502 by computing a weighted average of the three RGB colors of the pixels. The weighted average may take into account the human eye's stronger sensitivity to green light than red or blue light, such as by applying a factor of 0.59 to the green color values of a pixel, a factor of 0.30 to the red values of a pixel, and a factor of 0.11 to the blue values of the pixel as in the following equation:

$$Y=(0.30)R+(0.59)G+(0.11)B$$

When computing luminance, the weights applied to the color values may vary from those indicated above. The context generation module 210 can include luminance values for the pixels in the neighborhood 502, including the target pixel 504, for later use in constructing a spatially-adaptive filter for the target pixel.

Additionally, the context generation module 210 may include variance data in the luminance data 214, indicating a variance in luminance values of pixels in the neighborhood 502 surrounding the target pixel 504. As discussed above, variance measures how much values in a dataset are likely to differ from the mean of the values. In areas of the digital image with high luminance variance, the interference pattern is less likely to be noticed by the human eye, and therefore less smoothing is needed in these areas. In areas of the digital image with little luminance variance, the interference pattern is more likely to be noticed by the human eye, and therefore more smoothing is needed in these areas.

A luminance graph 506 is shown which represents luminance of the pixels in the neighborhood 502. A luminance of the target pixel 504 is represented by a bar at 508, and luminance of the remaining eight pixels in the neighborhood 502 are shown in the group of bars at 510. In this example, the luminance value for the target pixel 504 indicated by the bar at 508 varies significantly from the luminance values of the other pixels in the neighborhood 502 indicated by the group of bars at 510. The luminance graph 506 provides an example of a neighborhood with high luminance variance surrounding the target pixel 504. Because of the high variance, an interference pattern is not likely to be noticeable in this neighborhood, and less smoothing is thus used to remove the interference pattern at the target pixel 504.

In another example, a second neighborhood of pixels 512 is shown that surrounds a second target pixel 514. A second luminance graph 516 is also shown, which represents luminance of the pixels in the second neighborhood 512. A luminance of the second target pixel 514 is represented by a bar at 518, and luminance of the remaining eight pixels in the second neighborhood 512 are shown in the group of bars at 520. The second luminance graph 516 provides an example of a neighborhood with little luminance variance surrounding the second target pixel 514. Because of the little luminance variance, an interference pattern is likely to be more noticeable in this neighborhood, and increased amounts of smoothing are used to remove the interference pattern at the second target pixel 514 as contrasted with the high variance example above.

Returning again to the discussion of FIG. 2, a filter construction module 216 receives the distance data 210, the color data 212, and the luminance data 214, and uses this data to construct a spatially-adaptive filter 218 for the pixel. The filter construction module 216 may construct the spatially-adaptive filter 218 such that an amount of smoothing applied to the pixel is directly proportional to the distance from the pixel to the edge identified in the edge location data 210. The filter construction module 216 may also construct the spatially-adaptive filter 218 such that an amount of smoothing applied to the pixel is inversely proportional to a variance of color and/or luminance indicated in the color data 212 and/or the luminance data 214.

One example of a spatially-adaptive filter 218 that may be constructed by the filter construction module 216 is a two-dimensional (2D) Gaussian filter, represented by the following equation:

$$G(x, y) = Ae^{\frac{-(x-\mu_x)^2}{2\sigma_x^2} + \frac{-(y-\mu_y)^2}{2\sigma_y^2}}$$

where μ represents the mean and σ represents the variance. Other filters may also be used, such as bilateral filters, median filters, convolutional filters, and so forth.

A filter application module 220 receives the spatially-adaptive filter 218, and applies the spatially-adaptive filter to the pixel of the digital image 202. The filter application module 220 may apply multiple spatially-adaptive filters that have been generated for respective pixels of the digital image according to the following parameters to generate a filtered digital image 222:

$$T(x, y) = \begin{cases} F_1(x, y), & \text{Edge}(x, y) \geq d_1 \text{ and } \Delta L_v(x, y, d_1) \leq v_1 \\ F_2(x, y), & \text{Edge}(x, y) \geq d_2 \text{ and } \Delta L_v(x, y, d_2) \leq v_2 \\ & \dots \\ & \dots \\ F_n(x, y), & \text{Edge}(x, y) \geq d_n \text{ and } \Delta L_v(x, y, d_n) \leq v_n \end{cases}$$

where $d_1 > d_2 > \dots > d_n$ and $v_1 < v_2 < \dots < v_n$

In this case, T represents the output filtered digital image 222, F is the filter for a particular pixel located at (x, y), Edge is a function to determine the distance of the pixel to the edge of the object in the digital image 202, and $\Delta L_v$ is the variance in luminance in the neighborhood of the pixel at size d. Variance in color is not included in this example, but may be included in parameters to generate the filtered digital image 222 as described herein.

In some scenarios, the filtered digital image 222 may appear dull after smoothing, even with the spatially-adaptive filter 218. Consequently, the interference pattern removal module 120 may also include an image enhancement module 224 to improve perceptual quality of the filtered digital image 222. The image enhancement module 224 may perform operations such as making the filtered digital image 222 lighter or darker, increasing or decreasing contrast, sharpening or softening, and so on to generate an enhanced digital image 226.

The image enhancement module 224 outputs the enhanced digital image 226, for which, the interference pattern has been removed by using the spatially-adaptive filter 218. The image enhancement module 224 can output the enhanced digital image 226 to a user interface module 228, which outputs the enhanced digital image in a user interface 230 of the computing device 106. The user interface 230 may enable a user of the computing device 106 to edit or modify the enhanced digital image 226, and/or distribute the enhanced digital image to the service provider system 102, to name some examples.

Figure 6:
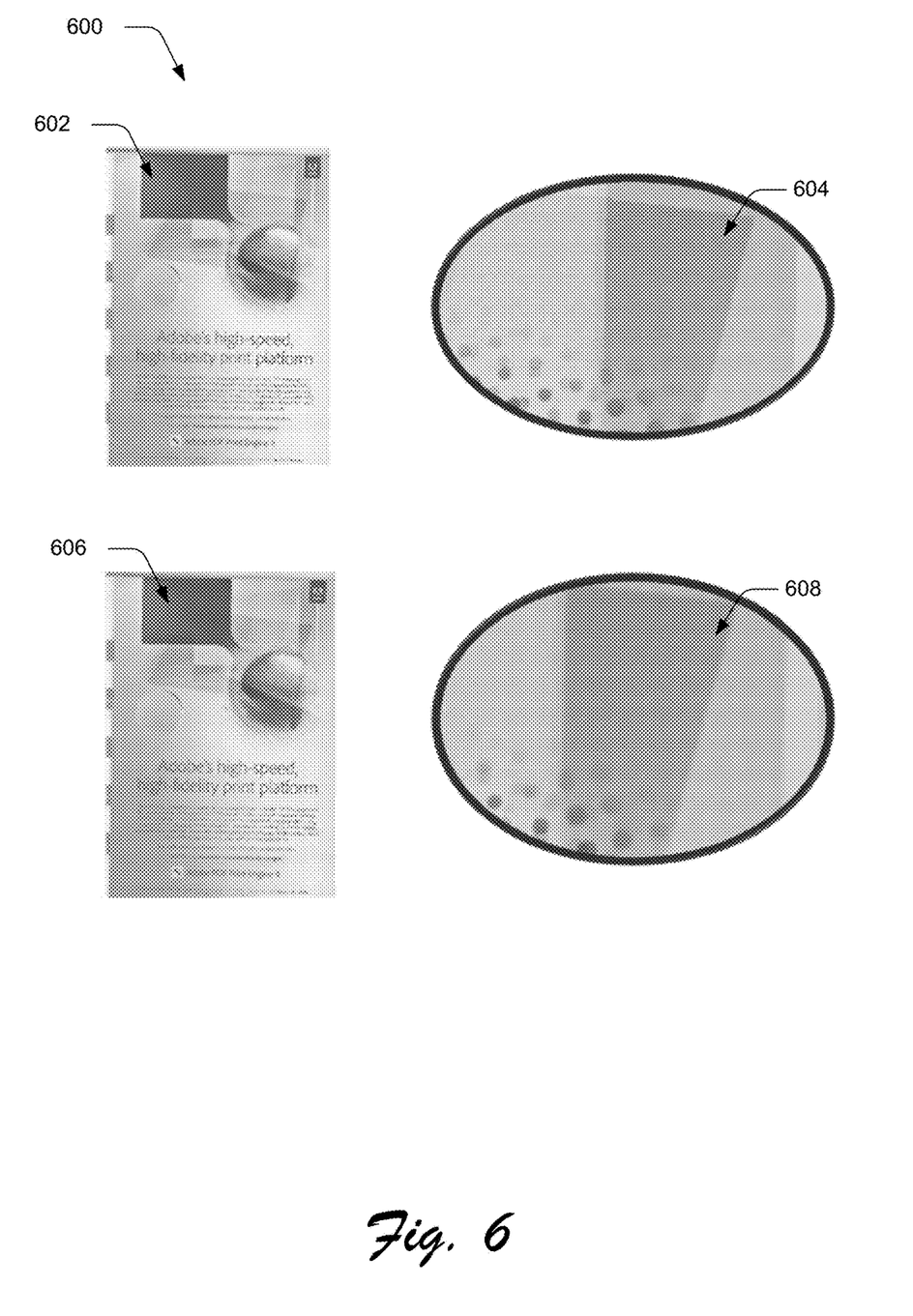
FIG. 6 illustrates an example output of the interference pattern removal techniques described herein as applied to a digital image in comparison with previous systems for interference pattern removal.

Using the techniques described herein, interference patterns can be removed from digital images more accurately, maintaining the overall sharpness and contrast of an image and preserving the images true edges while filtering out edges caused by the interference pattern. For example, consider FIG. 6, which illustrates an example output 600 of the interference pattern removal techniques described herein as applied to a digital image in comparison with previous systems for interference pattern removal. While FIG. 6 is depicted in grayscale, the techniques described herein execute equivalently on color images to remove interference patterns from the color images.

Particularly, a digital image 602 of a hard-copy document is shown, which may have been obtained by scanning the hard-copy document or taking a photograph of the hard-copy document with a digital camera, to name some examples. The digital image 602 has received global smoothing according to conventional techniques to remove an interference pattern from the digital image. Because of the shortfalls of the conventional techniques, an interference pattern remains in the digital image 602 even after application of the global smoothing, which can be seen in the zoomed-in portion 604 of the digital image. The zoomed-in portion 604 displays how the edges of objects in the digital image 602 are present, but not enough smoothing has been applied to uniform areas to remove the interference pattern.

A second digital image 606 of the same hard-copy document is also shown, this time with the techniques for removing an interference pattern using a spatially-adaptive filter applied. As seen in the zoomed-in portion 608 of the second digital image 606, applying a spatially-adaptive filter as described herein results in the interference pattern being essentially imperceptible. The zoomed-in portion 608 also shows how applying a spatially-adaptive filter preserves the edges of objects in the digital image, and filters out edges created because of the interference pattern. Further, the zoomed-in portion 608 displays how the interference pattern is removed from uniform areas of the digital image 606 by the spatially-adaptive filter, unlike the global smoothing techniques seen in the zoomed-in portion 604.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
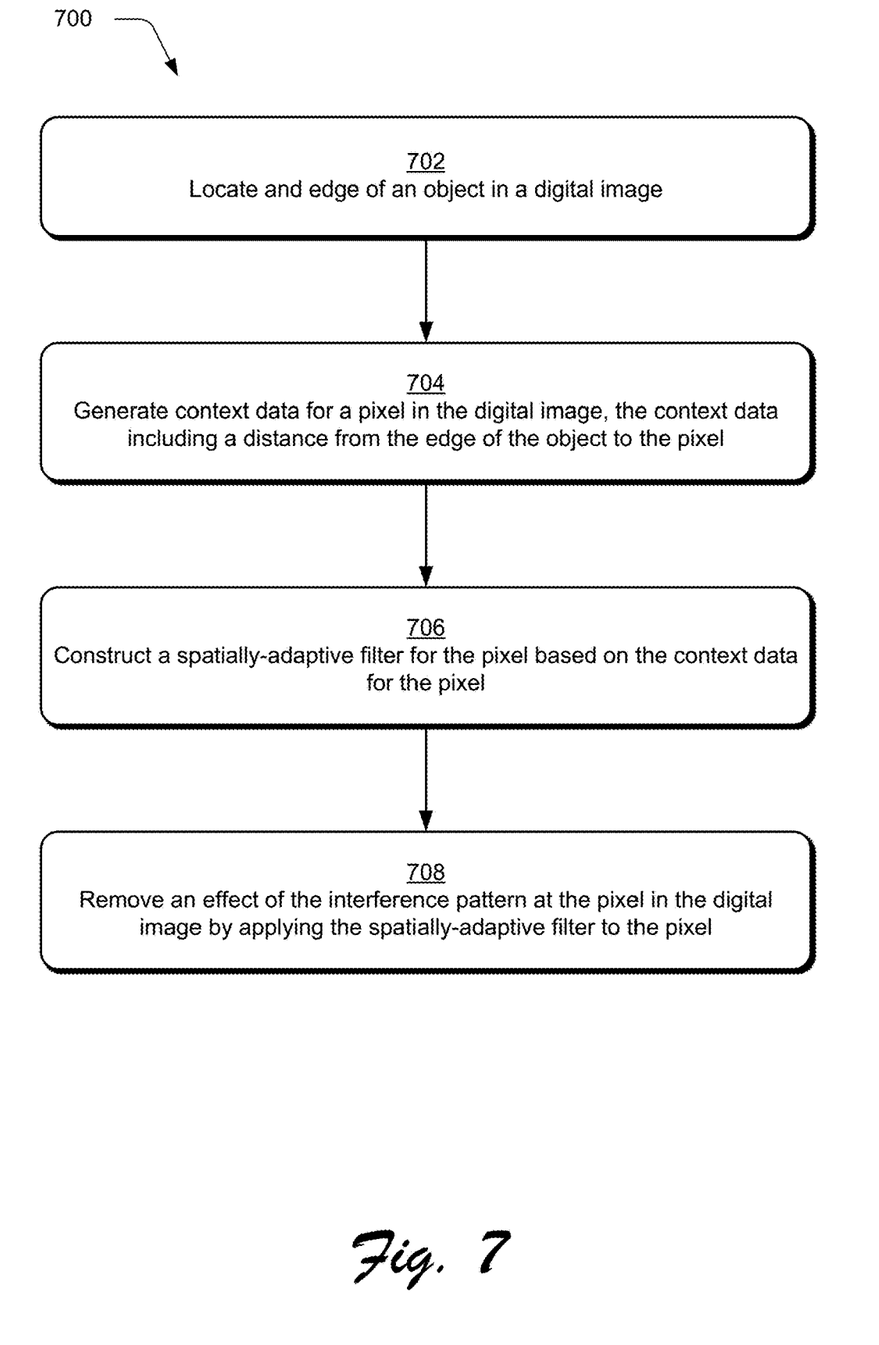
FIG. 7 is a flow diagram depicting a procedure in an example implementation in which interference patterns are removed from digital images in a digital image creation system.

FIG. 7 depicts a procedure 700 in an example implementation in which an interference pattern is removed from a digital image in a digital image creation system of a digital medium environment. First, an edge of an object is located in the digital image (block 702). The digital image may be a digital image of a hard-copy document, and may include an interference pattern caused by lines used to print the hard-copy document not aligning with the pixel rows of the digital image of the hard-copy document, for instance. The edge of the object may be located using edge detection techniques that identify points in the digital image where the image brightness changes sharply. To avoid identifying artifacts caused by an interference pattern as an edge of an object, the edge location module 204 may apply a lossy edge detection filter that preserves prominent edges (e.g., edges of objects in the digital image) and discards minor edges (e.g., edges of an interference pattern). Alternatively or additionally, the edge location module 204 may employ search-based edge detection, zero-crossing edge detection, or other techniques to locate the edge of the object.

Context data for a pixel in the digital image is then generated, including a distance from the edge of the object to the pixel (block 704). Often, a digital image includes multiple edges. When multiple edges exist in the digital image, the context generation module 208 may generate context data, e.g., based on an edge of an object that is nearest to the pixel. The context generation module 208 may do so based on a distance from the pixel to the nearest edge in the context data. Additionally, the context generation module 208 may use the distance from the pixel to the nearest edge to determine a size of a neighborhood for the pixel to include in the distance data 210. For example, a size of the neighborhood of the pixel may be proportional to the distance from edge of the object to the pixel.

The context generation module 208 can also generate color data 212 and luminance data 214 for surrounding pixels within the neighborhood to include in the context data. Therefore, an amount of color data 212 and luminance data 214 generated for different pixels may vary based on the distance from the edge of the object to the pixel, as the size of the neighborhood for the different pixels changes. The color data 212 represents a similarity of color between the pixel and surrounding pixels in the neighborhood of the pixel. The color data 212 can provide information as to an amount of variance of color exhibited in the content of the digital image 202 within the neighborhood surrounding the pixel. The luminance data 214 represents a similarity of luminance between the pixel and surrounding pixels in the neighborhood of the pixel. The luminance data 214 can provide information as to an amount of variance of luminance that exists in the content of the digital image within the neighborhood surrounding the pixel.

Next, a spatially-adaptive filter is constructed for the pixel based on the context data for the pixel (block 706). Using the distance data 210, the color data 212, and the luminance data 214, the filter construction module 216 constructs a spatially-adaptive filter 218 for the pixel. The filter construction module 216 may construct the spatially-adaptive filter 218 such that an amount of smoothing applied to the pixel is directly proportional to the distance from the pixel to the edge identified in the edge location data 210. The filter construction module 216 may also construct the spatially-adaptive filter 218 such that an amount of smoothing applied to the pixel is inversely proportional to a variance of color and/or luminance indicated in the color data 212 and/or the luminance data 214.

An effect of the interference pattern at the pixel in the digital image is removed by applying the spatially-adaptive filter to the pixel (block 708). For example, if the pixel is located near an edge, and the neighborhood surrounding the pixel has a high variance in color and/or luminance, then a smaller amount of smoothing is applied to remove the interference pattern at the pixel. On the other hand, if the pixel is located far from an edge, and the neighborhood surrounding the pixel has a low variance in color and/or luminance, then an increased amount of smoothing is applied to remove the interference pattern at the pixel relative to an instance of high variance. Adapting an amount of smoothing to apply to a pixel based on the context of the pixel and the pixel's surroundings efficiently and effectively removes interference patterns while maintaining the overall sharpness and contrast of the output digital image.

Example System and Device

Figure 8:
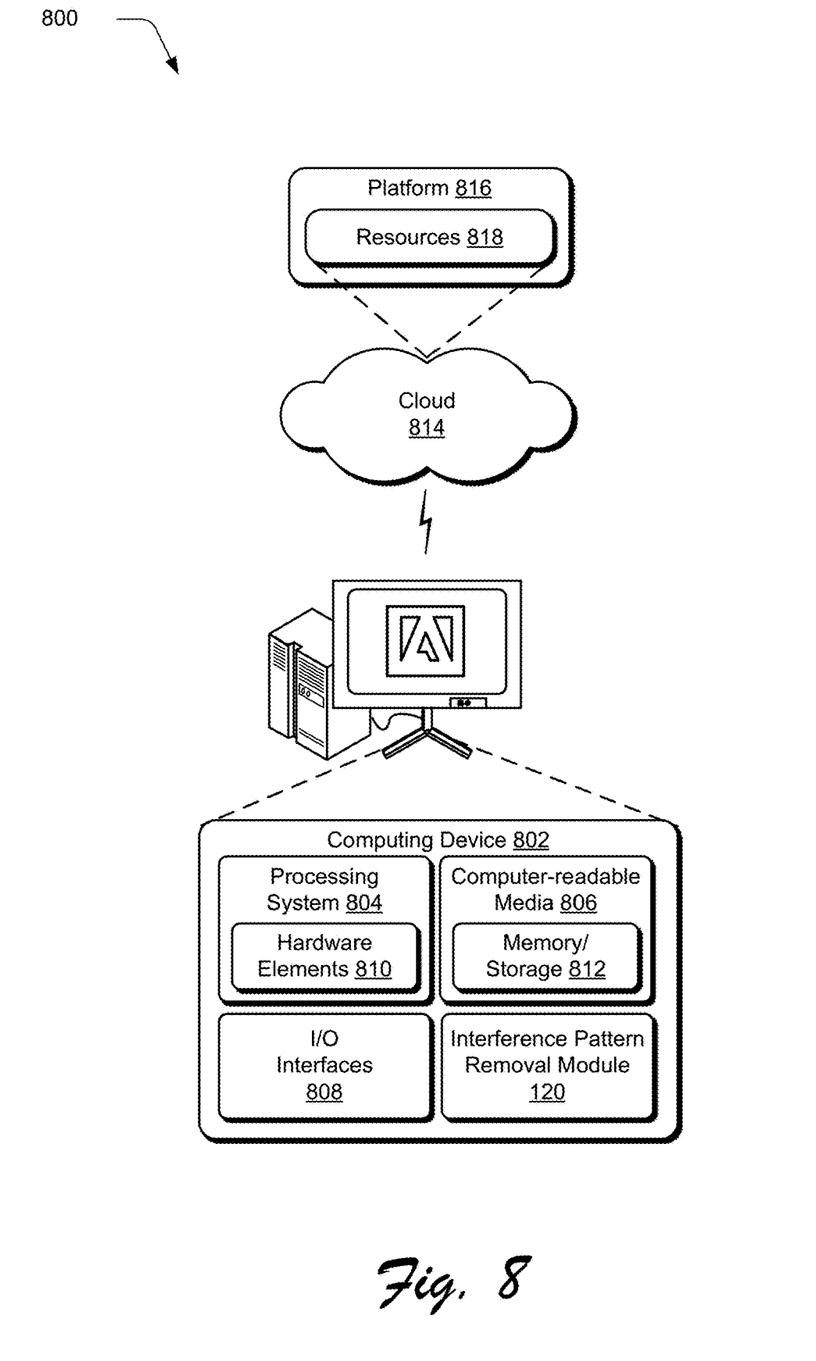
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the interference pattern removal module 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment for removal of an interference pattern from a digital image, a method implemented by at least one computing device, the method comprising:
  locating, by the computing device, an edge of an object in the digital image;
  generating, by the computing device, context data for a pixel in the digital image, the context data based on a distance from the edge of the object to the pixel;

constructing, by the computing device, a spatially-adaptive filter for the pixel based on the context data for the pixel; and removing, by the computing device, an effect of the interference pattern at the digital image by applying the spatially-adaptive filter to the pixel.

2. The method of claim 1, wherein the digital image is captured from a physical document.

3. The method of claim 1, wherein locating the edge of the object comprises applying a lossy edge detection filter that preserves prominent edges of the digital image and discards minor edges.

4. The method of claim 1, wherein the spatially-adaptive filter is constructed to apply an amount of smoothing to the pixel to remove the effect of the interference pattern that is directly proportional to the distance from the edge of the object to the pixel.

5. The method of claim 1, wherein generating the context data further includes determining a neighborhood of the pixel, and wherein a size of the neighborhood of the pixel is proportional to the distance from the edge of the object to the pixel.

6. The method of claim 5, wherein generating the context data further includes generating color data and luminance data for pixels in the neighborhood of the pixel.

7. The method of claim 1, wherein the context data further includes color data for the pixel representing a similarity of color between the pixel and surrounding pixels within the digital image.

8. The method of claim 7, wherein the color data further includes a variance of color of the pixel and the surrounding pixels.

9. The method of claim 8, wherein the spatially-adaptive filter is constructed to apply an amount of smoothing to the pixel to remove the effect of the interference pattern that is inversely proportional to the variance of color of the pixel and the surrounding pixels.

10. The method of claim 1, wherein the context data further includes luminance data for the pixel representing a similarity of luminance between the pixel and surrounding pixels within the digital image.

11. The method of claim 10, wherein the luminance data further includes a variance of luminance of the pixel and the surrounding pixels.

12. The method of claim 11, wherein the spatially-adaptive filter is constructed to apply an amount of smoothing to the pixel to remove the effect of the interference pattern that is inversely proportional to the variance of luminance of the pixel and the surrounding pixels.

13. In a digital medium environment for removal of an interference pattern from a digital image in a digital image creation system, a system comprising:

an edge location module implemented at least partially in hardware of at least one computing device to locate an edge of an object in the digital image;

a context generation module implemented at least partially in hardware of the at least one computing device to generate context data for a pixel in the digital image, the context data including:

a distance from the edge of the object to the pixel in the digital image; and color data and luminance data for the pixel, the color data and the luminance data representing a similarity of color and luminance between the pixel and surrounding pixels within the digital image, respectively; and a filter construction module implemented at least partially in hardware of the at least one computing device to construct a spatially-adaptive filter for the pixel based on the context data; and a filter application module implemented at least partially in hardware of the at least one computing device to remove the interference pattern by applying the spatially-adaptive filter to the digital image.

14. The system as described in claim 13, wherein the edge location module locates the edge of the object by applying apply a lossy edge detection filter that preserves prominent edges of the digital image and discards minor edges.

15. The system as described in claim 13, wherein the color data and luminance data include a variance of color and a variance of luminance of the pixel and the surrounding pixels.

16. The system as described in claim 15, wherein the filter construction module constructs the spatially-adaptive filter to apply an amount of smoothing to the pixel to remove the interference pattern that is inversely proportional to the variance of color and the variance of luminance of the pixel and the surrounding pixels.

17. The system as described in claim 13, wherein the filter construction module constructs the spatially-adaptive filter to apply an amount of smoothing to the pixel to remove the interference pattern that is directly proportional to the distance from the edge of the object to the pixel.

18. In a digital medium environment to remove an interference pattern from a digital image in a digital image creation system, a system comprising:

means for locating an edge of an object in the digital image;

means for generating context data for a pixel in the digital image, the context data including a distance from the edge of the object to the pixel;

means for constructing a spatially-adaptive filter for the pixel based on the context data for the pixel; and means for removing an effect of the interference pattern at the pixel in the digital image by applying the spatially-adaptive filter to the pixel.

19. The system as described in claim 18, wherein the means for locating the edge of the object are configured to apply a lossy edge detection filter that preserves prominent edges of the digital image and discards minor edges to locate the edge of the object.

20. The system as described in claim 18, wherein the context data further includes color data and luminance data for the pixel, the color data and the luminance data representing a similarity of color and luminance between the pixel and surrounding pixels within the digital image.

* * * * *